(12) United States Patent
Evans et al.

(10) Patent No.: US 7,293,178 B2
(45) Date of Patent: *Nov. 6, 2007

(54) METHODS AND SYSTEMS FOR MAINTAINING AN ENCRYPTED VIDEO MEMORY SUBSYSTEM

(75) Inventors: Glenn F. Evans, Kirkland, WA (US); Paul England, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 834 days.

This patent is subject to a terminal disclaimer.

(21) Appl. No.: 10/314,896

(22) Filed: Dec. 9, 2002

(65) Prior Publication Data

US 2004/0111627 A1    Jun. 10, 2004

(51) Int. Cl.
*G06F 11/30* (2006.01)
*G06F 12/14* (2006.01)
*H04L 9/32* (2006.01)

(52) U.S. Cl. .................................................. 713/192
(58) Field of Classification Search .................. None
See application file for complete search history.

(56) References Cited

U.S. PATENT DOCUMENTS

| | | | |
|---|---|---|---|
| 4,757,534 A | | 7/1988 | Matyas et al. |
| 4,962,533 A | | 10/1990 | Krueger et al. |
| 5,297,206 A | | 3/1994 | Orton |
| 5,321,749 A | * | 6/1994 | Virga ........................ 380/243 |
| 5,379,344 A | | 1/1995 | Larsson et al. |
| 5,537,467 A | | 7/1996 | Cheng et al. |
| 5,572,235 A | | 11/1996 | Mical et al. |
| 5,577,125 A | | 11/1996 | Salahshour et al. |
| 5,727,062 A | * | 3/1998 | Ritter ........................ 380/37 |
| 5,825,879 A | * | 10/1998 | Davis ........................ 380/216 |
| 5,881,287 A | | 3/1999 | Mast |
| 5,898,779 A | | 4/1999 | Squilla et al. |
| 5,963,909 A | | 10/1999 | Warren et al. |
| 6,044,182 A | | 3/2000 | Daly et al. |
| 6,047,342 A | | 4/2000 | Depew |

(Continued)

FOREIGN PATENT DOCUMENTS

WO    WO 02/25416    3/2002

OTHER PUBLICATIONS

"High-bandwidth Digital Content Protection System, Revision 1.0" Feb. 17, 2000, Intel Corporation, Hilllsboro, OR 97124, XP002305414 Retrieved from the Internet: URL:http://www.digital-cp.com/data/HDCP10.pdf>.

(Continued)

*Primary Examiner*—Emmanuel L. Moise
*Assistant Examiner*—Nadia Khoshnoodi (57) ABSTRACT

Methods and systems protect digital content such as premium content like movies, programs, and other types of digital audio/visual content. In some embodiments, an architecture and related methods protect content by maintaining the content in encrypted form, whether the content resides in video card memory (referred to herein as "VRAM"), or some other local or remote memory subsystem. The methods and systems enable video card co-processors, such as the graphics processing unit (GPU) to manipulate the encrypted content or data. In various embodiments, the content is maintained in an encrypted format and is unencrypted only when the GPU operates upon the data. After the GPU operates upon the data, the resultant data is re-encrypted and written to memory.

52 Claims, 6 Drawing Sheets

U.S. PATENT DOCUMENTS

| | | | |
|---|---|---|---|
| 6,055,314 A | 4/2000 | Spies et al. | |
| 6,064,739 A * | 5/2000 | Davis | 380/200 |
| 6,072,873 A | 6/2000 | Bewick | |
| 6,115,819 A | 9/2000 | Anderson | |
| 6,246,768 B1 | 6/2001 | Kim | |
| 6,330,624 B1 | 12/2001 | Cromer et al. | |
| 6,408,390 B1 | 6/2002 | Saito | |
| 6,421,733 B1 | 7/2002 | Tso et al. | |
| 6,731,756 B1 * | 5/2004 | Pizano et al. | 380/201 |
| 6,859,832 B1 | 2/2005 | Gecht et al. | |
| 6,865,431 B1 | 3/2005 | Hirota et al. | |
| 6,934,389 B2 * | 8/2005 | Strasser et al. | 380/201 |
| 7,024,558 B1 | 4/2006 | Satake | |
| 7,055,038 B2 | 5/2006 | Porter et al. | |
| 7,096,204 B1 * | 8/2006 | Chen et al. | 705/74 |
| 7,197,648 B2 | 3/2007 | Evans | |
| 7,202,875 B2 | 4/2007 | Foehr et al. | |
| 7,206,940 B2 | 4/2007 | Evans et al. | |
| 2002/0012432 A1 | 1/2002 | England et al. | |
| 2002/0103964 A1 * | 8/2002 | Igari | 711/112 |
| 2002/0136408 A1 * | 9/2002 | Garcia | 380/259 |
| 2002/0169979 A1 | 11/2002 | Zimmer | |
| 2003/0017846 A1 | 1/2003 | Estevez et al. | |
| 2003/0059047 A1 | 3/2003 | Iwamura | |
| 2003/0093683 A1 * | 5/2003 | Wong et al. | 713/189 |
| 2005/0102264 A1 * | 5/2005 | Nason et al. | 707/1 |
| 2005/0102266 A1 | 5/2005 | Nason et al. | |
| 2005/0204165 A1 | 9/2005 | Nason et al. | |
| 2006/0123248 A1 | 6/2006 | Porter et al. | |

OTHER PUBLICATIONS

Abhijit K. Choudhury et al., "Copyright Protection for Electronic Publishing Over Computer Networks," IEEE Network, May/Jun. 1995, pp. 12-20.

* cited by examiner

METHODS AND SYSTEMS FOR MAINTAINING AN ENCRYPTED VIDEO MEMORY SUBSYSTEM

RELATED APPLICATIONS

This application is related to the following U.S. Patent Applications, the disclosures of which are incorporated by reference herein:

U.S. patent application Ser. No. 10/052,840, entitled "Secure Video Card Methods and Systems," filed Jan. 16, 2002;

U.S. patent application Ser. No. 10/178,822, entitled "Methods and Systems Providing Per Pixel Security and Functionality," filed Jun. 24, 2002; and U.S. patent application Ser. No. 10/178,804, entitled "Systems and Methods for Securing Video Card Output," filed Jun. 24, 2002.

TECHNICAL FIELD

This invention relates to methods and systems for processing data using video cards.

BACKGROUND

Typically, a content author, such as a movie studio or a user publishing content on the web, will publish video content that has restrictions on how users can view it. This content can typically be viewed or rendered on a computer such as a personal computer. A great deal of time, effort and money is spent each year by unscrupulous individuals and organizations trying to steal or otherwise inappropriately obtain such video content.

One of the points of attack can be the computer on which such video content is to be viewed or rendered. That is, rogue programs or devices can and often do try to inappropriately obtain video content once it has been received on a computer, such as a personal computer. Among other computer components, this attack can be waged against the video card that processes the video content and/or the bus that transports the video content to and from the video card.

Figure 1:
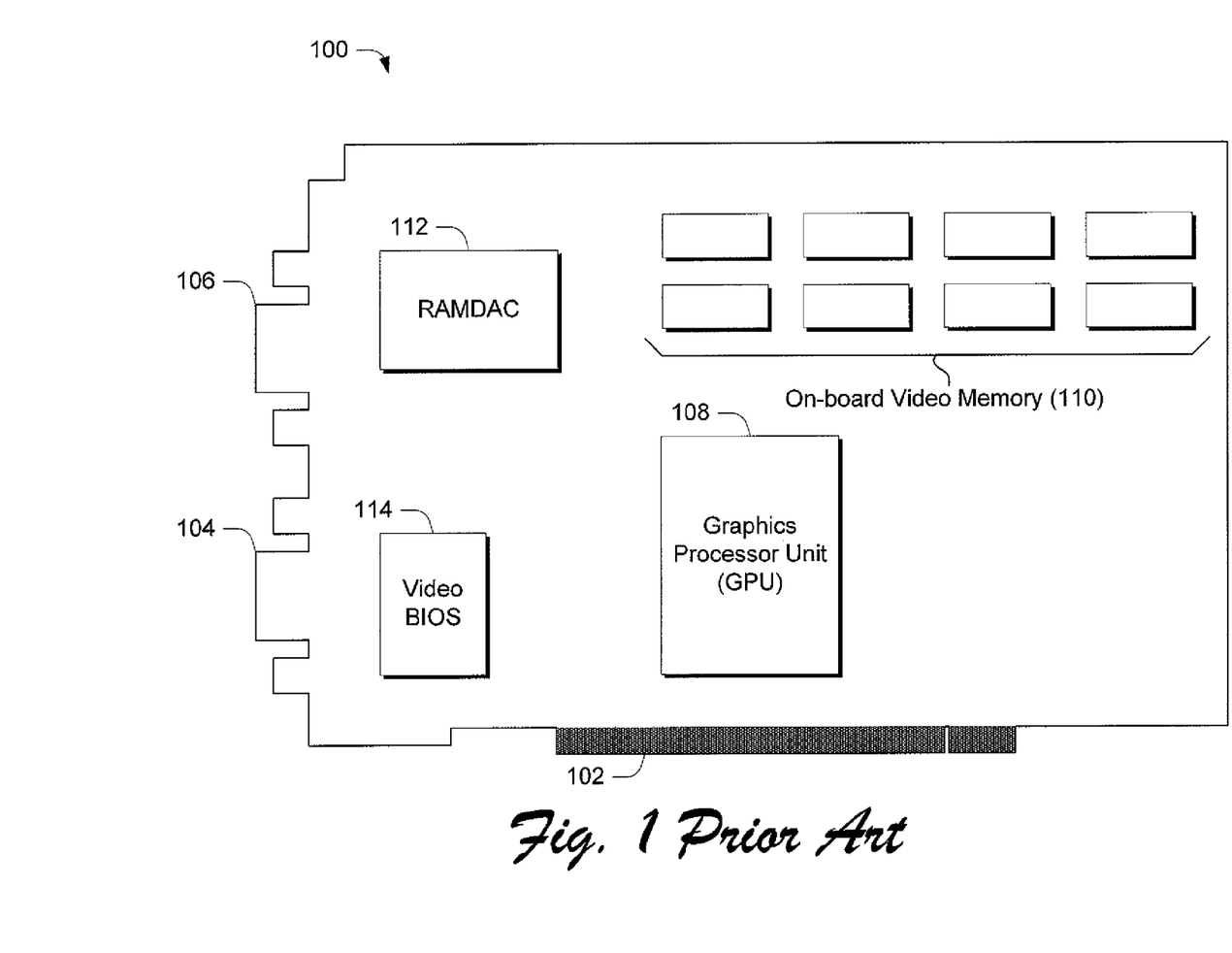
FIG. 1 is a block diagram that shows various components of an exemplary video or graphics card that is intended for use in a computer system.

FIG. 1 shows an exemplary video (or graphics) card 100 that includes a bus connector 102 that inserts into a port on a typical computer. Video card 100 also includes a monitor connector 104 (e.g. a 15-pin plug) that receives a cable that connects to a monitor. Video card 100 can include a digital video-out socket 106 that can be used for sending video images to LCD and flat panel monitors and the like.

The modern video card consists of four main components: the graphics processor unit (GPU) 108, the video memory 110, the random access memory digital-to-analog converter (RAMDAC) 112, and the driver software which can be included in the Video BIOS 114.

GPU 108 is a dedicated graphics processing chip that controls all aspects of resolution, color depth, and all elements associated with rendering images on the monitor screen. The computer's central processing unit or CPU (not shown) sends a set of drawing instructions and data, which are interpreted by the graphics card's proprietary driver and executed by the card's GPU 108. GPU 108 performs such operations as bitmap transfers and painting, window resizing and repositioning, line drawing, font scaling and polygon drawing. The GPU 108 is designed to handle these tasks in hardware at far greater speeds than the software running on the system's CPU. The GPU then writes the frame data to the frame buffer (or on-board video memory 110). The GPU greatly reduces the workload of the system's CPU.

The memory that holds the video image is also referred to as the frame buffer and is usually implemented on the video card itself. In this example, the frame buffer is implemented on the video card in the form of memory 110. Early systems implemented video memory in standard DRAM. However, this requires continual refreshing of the data to prevent it from being lost and cannot be modified during this refresh process. The consequence, particularly at the very fast clock speeds demanded by modern graphics cards, is that performance is badly degraded.

An advantage of implementing video memory on the video card itself is that it can be customized for its specific task and, indeed, this has resulted in a proliferation of new memory technologies:

Video RAM (VRAM): a special type of dual-ported DRAM, which can be written to and read from at the same time. It also requires far less frequent refreshing than ordinary DRAM and consequently performs much better;

Windows RAM (WRAM): as used by the Matrox Millennium card, is also dual-ported and can run slightly faster than conventional VRAM;

EDO DRAM: which provides a higher bandwidth than DRAM, can be clocked higher than normal DRAM and manages the read/write cycles more efficiently;

SDRAM: Similar to EDO RAM except the memory and graphics chips run on a common clock used to latch data, allowing SDRAM to run faster than regular EDO RAM;

SGRAM: Same as SDRAM but also supports block writes and write-per-bit, which yield better performance on graphics chips that support these enhanced features; and DRDRAM: Direct RDRAM is a totally new, general-purpose memory architecture which promises a 20-fold performance improvement over conventional DRAM.

Some designs integrate the graphics circuitry into the motherboard itself and use a portion of the system's RAM for the frame buffer. This is called "unified memory architecture" and is used for reasons of cost reduction only and can lead to inferior graphics performance.

The information in the video memory frame buffer is an image of what appears on the screen, stored as a digital bitmap. But while the video memory contains digital information its output medium—monitor—may use analog signals. The analog signals require more than just an "on" or "off" signal, as it is used to determine where, when and with what intensity the electron guns should be fired as they scan across and down the front of the monitor. This is where RAMDAC 112 comes into play as described below. Some RAMDACs also support digital video interface (DVI) outputs for digital displays such as LCD monitors. In such configurations, the RAMDAC converts the internal digital representation into a form understandable by the digital display.

The RAMDAC plays the roll of a "display converter" since it converts the internal digital data into a form that is understood by the display.

Even though the total amount of video memory installed on the video card may not be needed for a particular resolution, the extra memory is often used for caching information for the GPU 108. For example, the caching of commonly used graphical items—such as text fonts and icons or images—avoids the need for the graphics subsystem to load these each time a new letter is written or an icon is moved and thereby improves performance. Cached images can be used to queue up sequences of images to be presented by the GPU, thereby freeing up the CPU to perform other tasks.

Many times per second, RAMDAC 112 reads the contents of the video memory, converts it into a signal, and sends it over the video cable to the monitor. For analog displays, there is typically one Digital-to-Analog Converter (DAC) for each of the three primary colors the CRT uses to create a complete spectrum of colors. For digital displays, the RAMDAC outputs a single RGB data stream to be interpreted and displayed by the output device. The intended result is the right mix needed to create the color of a single pixel. The rate at which RAMDAC 112 11 can convert the information, and the design of GPU 108 itself, dictates the range of refresh rates that the graphics card can support. The RAMDAC 112 also dictates the number of colors available in a given resolution, depending on its internal architecture.

The bus connector 102 can support one or more busses that are used to connect with the video card. For example, an Accelerated Graphics Port (AGP) bus can enable the video card to directly access system memory. Direct memory access helps to make the peak bandwidth many times higher than the Peripheral Component Interconnect (PCI) bus. This can allow the system's CPU to do other tasks while the GPU on the video card accesses system memory.

During operation, the data contained in the on-board video memory can be provided into the computer's system memory and can be managed as if it were part of the system's memory. This includes such things as virtual memory management techniques that the computer's memory manager employs. Further, when the data contained in the system's memory is needed for a graphics operation on the video card, the data can be sent over a bus (such as a PCI or AGP bus) to the video card and stored in the on-board video memory 110. There, the data can be accessed and manipulated by GPU 108 as described above.

This invention arose out of concerns associated with providing methods and systems for protecting data that is used in connection with a video card.

SUMMARY

Methods and systems protect digital content such as premium content like movies, programs, and other types of digital audio/visual content. In some embodiments, an architecture and related methods protect content by maintaining the content in encrypted form, whether the content resides in video card memory (referred to herein as "VRAM"), or some other local or remote memory subsystem. The methods and systems enable video card co-processors, such as the graphics processing unit (GPU) to manipulate the encrypted content or data. In various embodiments, the content is maintained in an encrypted format and is unencrypted only when the GPU operates upon the data. After the GPU operates upon the data, the resultant data is re-encrypted and written to memory.

DETAILED DESCRIPTION

Exemplary Computer System

Figure 2:
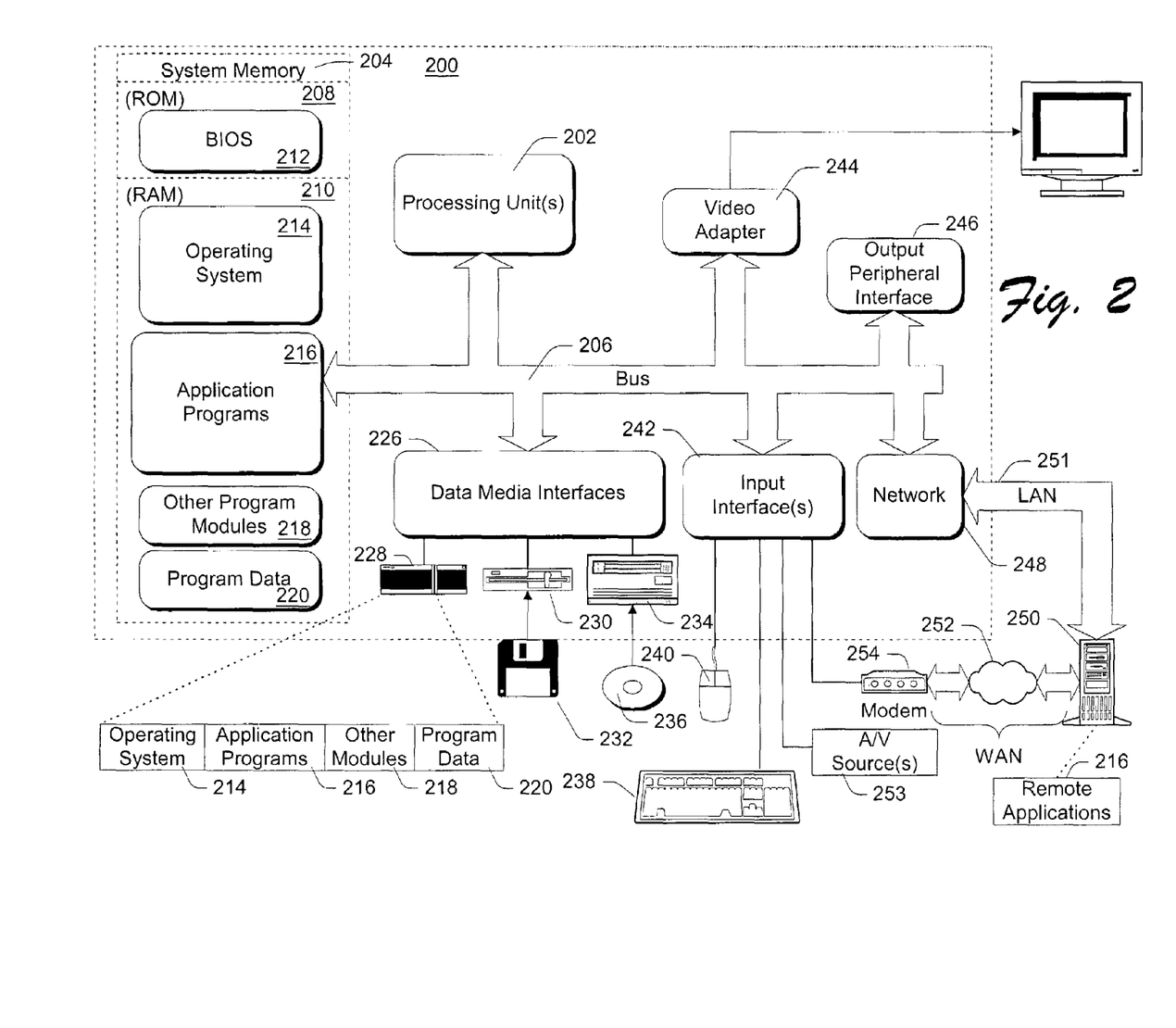
FIG. 2 is a block diagram of an exemplary computer system that can employ video cards in accordance with the described embodiment.

FIG. 2 illustrates an example of a suitable computing environment 200 on which the system and related methods described below can be implemented.

It is to be appreciated that computing environment 200 is only one example of a suitable computing environment and is not intended to suggest any limitation as to the scope of use or functionality of the media processing system. Neither should the computing environment 200 be interpreted as having any dependency or requirement relating to any one or combination of components illustrated in the exemplary computing environment 200.

The various described embodiments can be operational with numerous other general purpose or special purpose computing system environments or configurations. Examples of well known computing systems, environments, and/or configurations that may be suitable for use with the media processing system include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

In certain implementations, the system and related methods may well be described in the general context of computer-executable instructions, such as program modules, being executed by a computer. Generally, program modules include routines, programs, objects, components, data structures, etc. that perform particular tasks or implement particular abstract data types. The embodiments can also be practiced in distributed computing environments where tasks are performed by remote processing devices that are linked through a communications network. In a distributed computing environment, program modules may be located in both local and remote computer storage media including memory storage devices.

In accordance with the illustrated example embodiment of FIG. 2, computing system 200 is shown comprising one or more processors or processing units 202, a system memory 204, and a bus 206 that couples various system components including the system memory 204 to the processor 202.

Bus 206 is intended to represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 200 typically includes a variety of computer readable media. Such media may be any available media that is locally and/or remotely accessible by computer 200, and it includes both volatile and non-volatile media, removable and non-removable media.

In FIG. 2, the system memory 204 includes computer readable media in the form of volatile, such as random access memory (RAM) 210, and/or non-volatile memory, such as read only memory (ROM) 208. A basic input/output system (BIOS) 212, containing the basic routines that help to transfer information between elements within computer 200, such as during start-up, is stored in ROM 208. RAM 210 typically contains data and/or program modules that are immediately accessible to and/or presently be operated on by processing unit(s) 202.

Computer 200 may further include other removable/non-removable, volatile/non-volatile computer storage media. By way of example only, FIG. 2 illustrates a hard disk drive 228 for reading from and writing to a non-removable non-volatile magnetic media (not shown and typically called a "hard drive"), a magnetic disk drive 230 for reading from and writing to a removable, non-volatile magnetic disk 232 (e.g., a "floppy disk"), and an optical disk drive 234 for reading from or writing to a removable, non-volatile optical disk 236 such as a CD-ROM, DVD-ROM or other optical media. The hard disk drive 228, magnetic disk drive 230, and optical disk drive 234 are each connected to bus 206 by one or more interfaces 226.

The drives and their associated computer-readable media provide nonvolatile storage of computer readable instructions, data structures, program modules, and other data for computer 200. Although the exemplary environment described herein employs a hard disk 228, a removable magnetic disk 232 and a removable optical disk 236, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk 228, magnetic disk 232, optical disk 236, ROM 208, or RAM 210, including, by way of example, and not limitation, an operating system 214, one or more application programs 216 (e.g., multimedia application program 224), other program modules 218, and program data 220. A user may enter commands and information into computer 200 through input devices such as keyboard 238 and pointing device 240 (such as a "mouse"). Other input devices may include a audio/video input device(s) 253, a microphone, joystick, game pad, satellite dish, serial port, scanner, or the like (not shown). These and other input devices are connected to the processing unit(s) 202 through input interface(s) 242 that is coupled to bus 206, but may be connected by other interface and bus structures, such as a parallel port, game port, or a universal serial bus (USB).

A monitor 256 or other type of display device is also connected to bus 206 via an interface, such as a video adapter or video/graphics card 244. In addition to the monitor, personal computers typically include other peripheral output devices (not shown), such as speakers and printers, which may be connected through output peripheral interface 246.

Computer 200 may operate in a networked environment using logical connections to one or more remote computers, such as a remote computer 250. Remote computer 250 may include many or all of the elements and features described herein relative to computer.

As shown in FIG. 2, computing system 200 is communicatively coupled to remote devices (e.g., remote computer 250) through a local area network (LAN) 251 and a general wide area network (WAN) 252. Such networking environments are commonplace in offices, enterprise-wide computer networks, intranets, and the Internet.

When used in a LAN networking environment, the computer 200 is connected to LAN 251 through a suitable network interface or adapter 248. When used in a WAN networking environment, the computer 200 typically includes a modem 254 or other means for establishing communications over the WAN 252. The modem 254, which may be internal or external, may be connected to the system bus 206 via the user input interface 242, or other appropriate mechanism.

In a networked environment, program modules depicted relative to the personal computer 200, or portions thereof, may be stored in a remote memory storage device. By way of example, and not limitation, FIG. 2 illustrates remote application programs 216 as residing on a memory device of remote computer 250. It will be appreciated that the network connections shown and described are exemplary and other means of establishing a communications link between the computers may be used.

Overview

The various methods and systems described herein are directed to protecting content such as premium content like movies, programs, and other types of digital audio/visual content. In the described embodiments, an architecture and related methods protect content by maintaining the content in encrypted form, whether the content resides in video card memory (referred to herein as "VRAM"), or some other local or remote memory subsystem. The methods and systems enable video card co-processors, such as the graphics processing unit (GPU) to manipulate the encrypted data. Processing on the GPU can be controlled, in some embodiments, by an application that need not necessarily be entirely trusted.

Maintaining the content in encrypted form in the memory is more resistant to security leaks since only select portions of the GPU are able to access unencrypted content.

Figure 3:
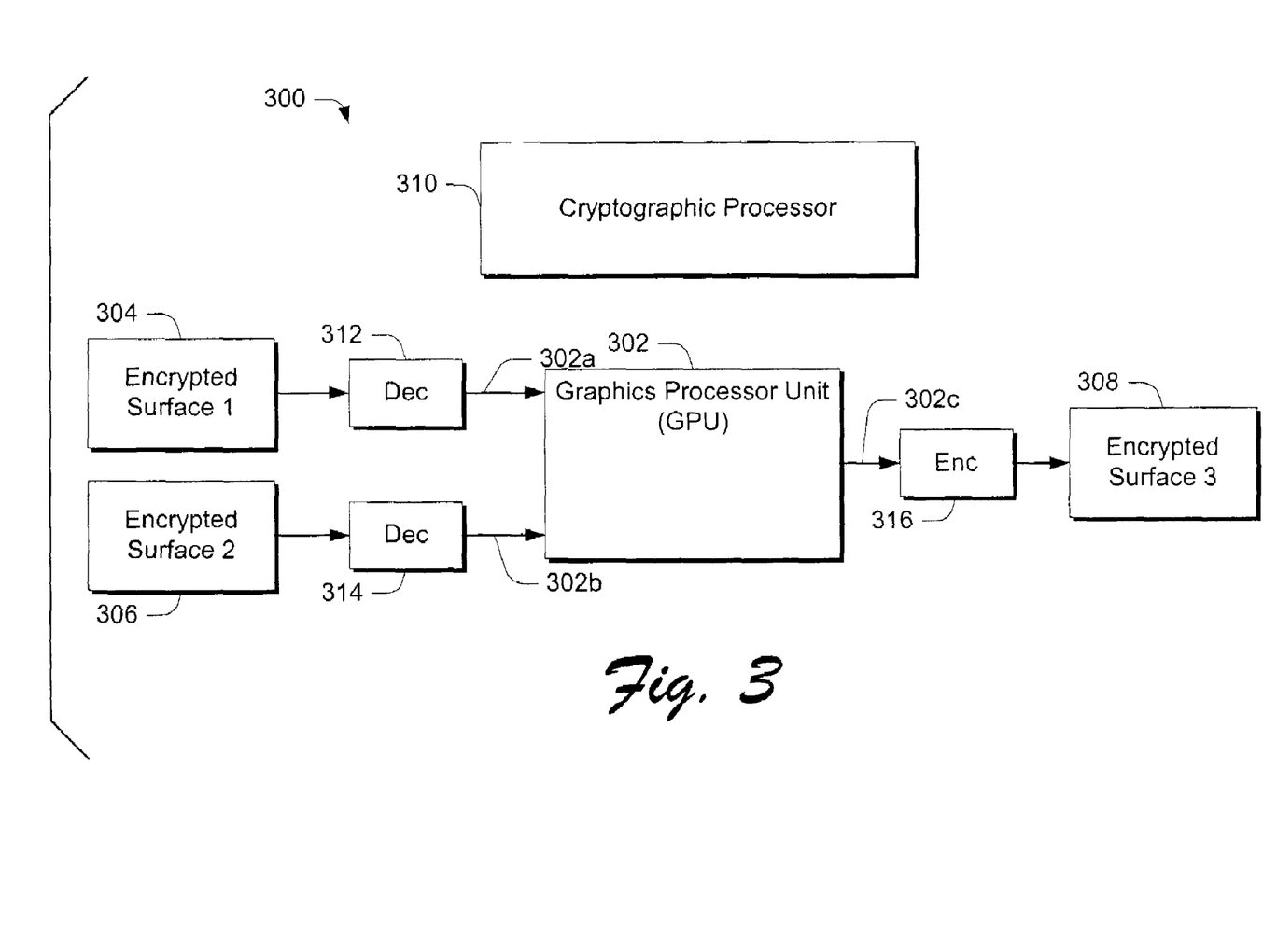
FIG. 3 is a block diagram that shows various components of an exemplary video or graphics card in accordance with one embodiment.

As an overview to an exemplary system, consider the FIG. 3 system at 300 which represents some of the components that can reside on a video card. There, system 300 comprises a graphics processor unit 302 having multiple inputs 302a, 302b, and an output 302c. In this example and for simplicity, only two inputs are illustrated for the GPU. Typically, however, GPU's have more than two inputs. In some embodiments, the GPU has eight inputs. Each of the GPU's inputs is associated with a portion of memory (also referred to as a "surface") that holds data that is subject to processing by the GPU. In this example, since there are two GPU inputs, there are two surfaces 304, 306. Thus, the pixels from surface 304 constitute one input to the GPU and the pixels from surface 306 constitute the other input for the GPU.

The GPU is configured to operate upon the data of each of surfaces 304, 306 and provide the output of its operation onto an output surface 308. This output surface can then be read and rendered to a display by other components that reside on the video card. The operations that can be performed by the GPU are also termed "programs" and can be represented as mathematical operations such as additions, subtractions, multiplications and the like, or include control instructions such as looping or branching, as will be appreciated and understood by the skilled artisan. That is, the GPU might take values associated with individual pixels of surface 304, and add those values to values associated with individual pixels of surface 306, and write the corresponding result to a pixel address on surface 308.

Notice in the illustration that the data on each of surfaces 304, 306 and 308 is encrypted. In accordance with one embodiment, a cryptographic processor 310 is associated with the video card and represents a trusted component. In this example, the cryptographic processor comprises a hardware component in the form of an integrated circuit chip that is physically mounted on the video card. The cryptographic processor is responsible for setting up decryptors and encryptors to assist in decryption and encryption operations on the video card. Accordingly, decryptors 312, 314 and encryptor 316 are associated with cryptographic processor 310. In this illustration, the decryptors and encryptor are shown to logically reside between the GPU 302 and a surface of the VRAM. The decryptors and encryptors can be physically located in other places. For example, the GPU can have specially configured encryption hardware which is configurable by the cryptographic processor, as noted below.

In one embodiment, each individual surface of the VRAM that is to hold encrypted content is associated with its own encryptor/decryptor. The encryption/decryption algorithms and keys that are associated with a particular surface can be unique for that surface. Thus, decryptor 312 uses a unique key associated with data on surface 304 to decrypt the data and enable the GPU to process the data. Similarly, decryptor 314 uses a unique key associated with data on surface 306 to decrypt the data and enable the GPU to process the data. The output surface 308 to which the resultant data is written by the GPU has its own associated encryptor which encrypts the resultant data and writes the encrypted data to the surface. The index of the key within the cryptoprocessor can be returned to the application to be used to identify (by associating the appropriate surface with it) which keys should be used within the decryption and re-encryption operations.

In this example, data that resides in the VRAM (or some other local or remote memory) is always kept in encrypted form. The data is only decrypted when the GPU is to operate upon it and then after the operation, before the data is written to the VRAM, it is re-encrypted.

In this example, whenever the GPU 302 wishes to perform an operation on encrypted data that resides on a surface, on a per pixel basis, a surface-associated decoder, under the influence of cryptoprocessor 310, decrypts each pixel and provides the pixels to the GPU for the operation. After the operation, an encryptor, under the influence of the cryptoprocessor 310, re-encrypts the output of the GPU to provide the encrypted result to another surface of the VRAM.

As an added measure of safety, the various operations or programs that can be performed by the GPU can be restricted if encrypted output is available. That is, it is possible for some GPU operations to permit resultant data to be written to a cache and then later written out to an external memory location without being encrypted. In these situations, the video card can be programmed to disallow those types of operations thus ensuring the protection of the data.

This way, the only time that data is actually in the open in an unencrypted form is when the pixel inputs are being provided to or within, and operated upon by the GPU. Now, once the resultant data has been provided onto a different surface, for example surface 308, the DAC can read the encrypted surface, decrypt it and then display the data to a suitable display.

An added benefit of this system is that the GPU is actually allowed to perform operations on the data which can greatly accelerate the graphics processing capabilities of the video card. This system also maintains the video memory in protected, encrypted form so that if any components, rogue programs and the like start snooping around the VRAM, all that is present is encrypted data.

Figure 4:
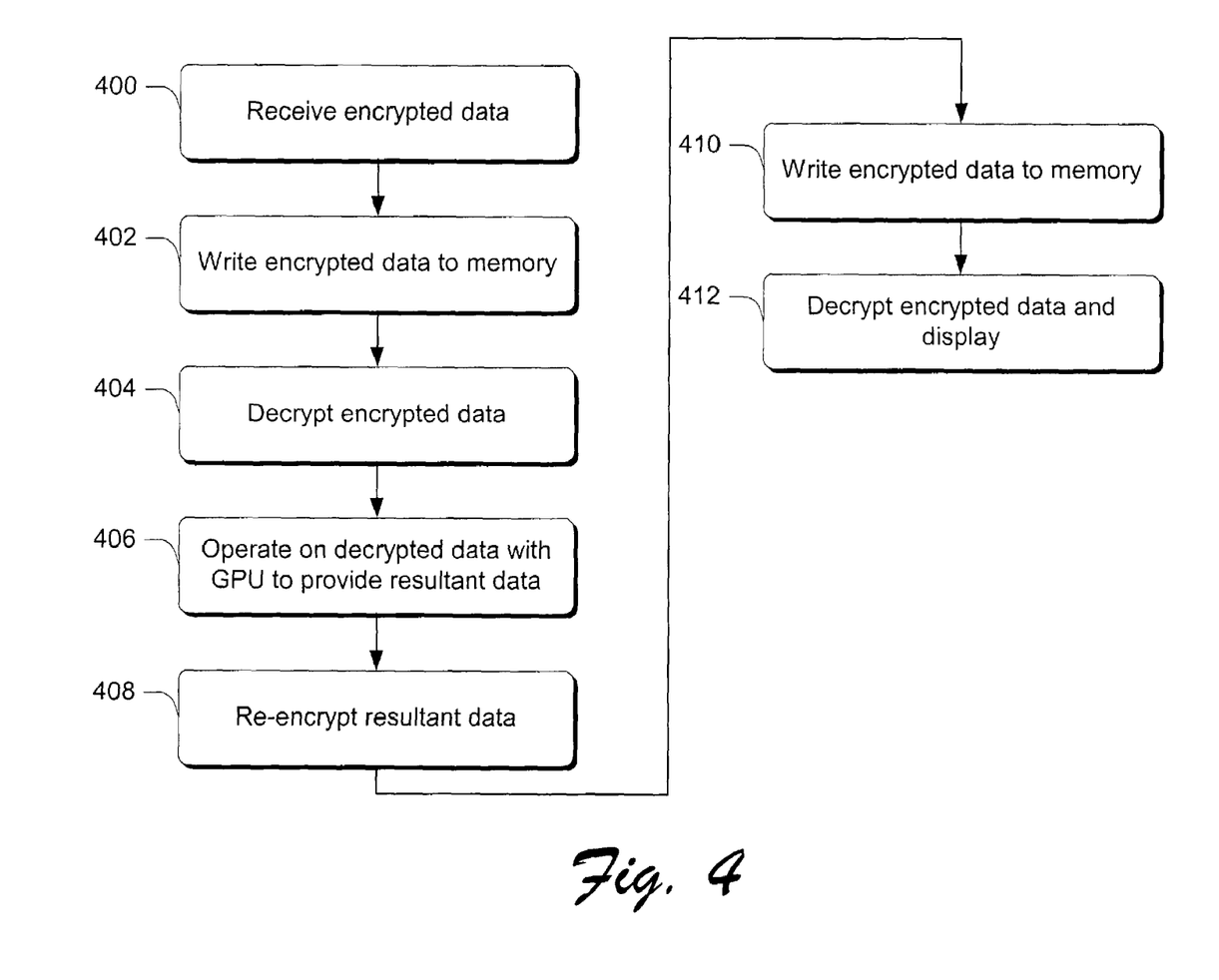
FIG. 4 is a flow diagram that describes steps in a method in accordance with one embodiment.

FIG. 4 is a flow diagram that describes steps in a method in accordance with one embodiment. The method can be implemented in connection with any suitable hardware, software, firmware or combination thereof. In the illustrated and described embodiment, the method can be implemented in connection with the systems described above and below.

Step 400 receives encrypted data. The encrypted data can typically comprise some form of protected content. Step 402 writes the encrypted data to memory. This memory can comprise local or remote memory. In the examples given above, the memory comprises the video card's memory such as the VRAM. Step 404 decrypts the encrypted data. This step can be performed responsive to an indication that the data is to undergo some type of operation by the GPU. This indication can come from an application which effectively notifies the video card to perform some type of operation on data that it specifies. It is not necessary for the application to be protected or trusted as it is not necessary for the application to access the data. In addition, this step can be performed by a suitably configured decryption component. In the FIG. 3 example, such a component is provided in the form of a decryptor that is associated with a hardware cryptographic processor that controls encryption and decryption capabilities on the video card. Further, in the FIG. 3 example, each surface or memory portion that is to hold encrypted data has its own associated encryptor and decryptor. It is to be noted and appreciated that while the decryptors and encryptor that are illustrated in FIG. 3 are shown to reside outside the GPU, such need not be the case. That is, the GPU can have its own cryptographic hardware that is communicatively associated with the cryptographic processor. In this situation, the decryption and encryption takes place inside the GPU, and not externally as might be suggested by the FIG. 3 illustration. The keys are controlled by the cryptographic processor and are not available to other components within the GPU (other than the encryptors and decryptors).

Step 406 operates on the decrypted data with the GPU to provide resultant data. Any suitable GPU operations can be performed, as noted above. Step 408 re-encrypts the resultant data. This step can be implemented by a suitably configured encryption component, an example of which is provided above. Step 410 writes the encrypted data to memory. This step can be implemented by writing the encrypted data to any suitable memory. In the illustrated and described example, the encrypted data is written to a VRAM surface that is compatible with the surfaces from which the data was originally read. Step 412 decrypts and displays the encrypted data. This step can be performed by a suitably configured display converter such as a RAMDAC.

Thus, the above system can maintain data in the VRAM in encrypted form, on a per-pixel basis, anytime when a GPU operation is not being performed on the data. Additionally, the encrypted data can be decrypted on a pixel-by-pixel basis and accordingly processed by the GPU before being re-encrypted and written back out to the VRAM.

It is to be appreciated and understood that any number of suitable encryption/decryption paradigms could be utilized in connection with and to implement the above-described system without departing from the spirit and scope of the claimed subject matter.

Exemplary Architecture

Figure 5:
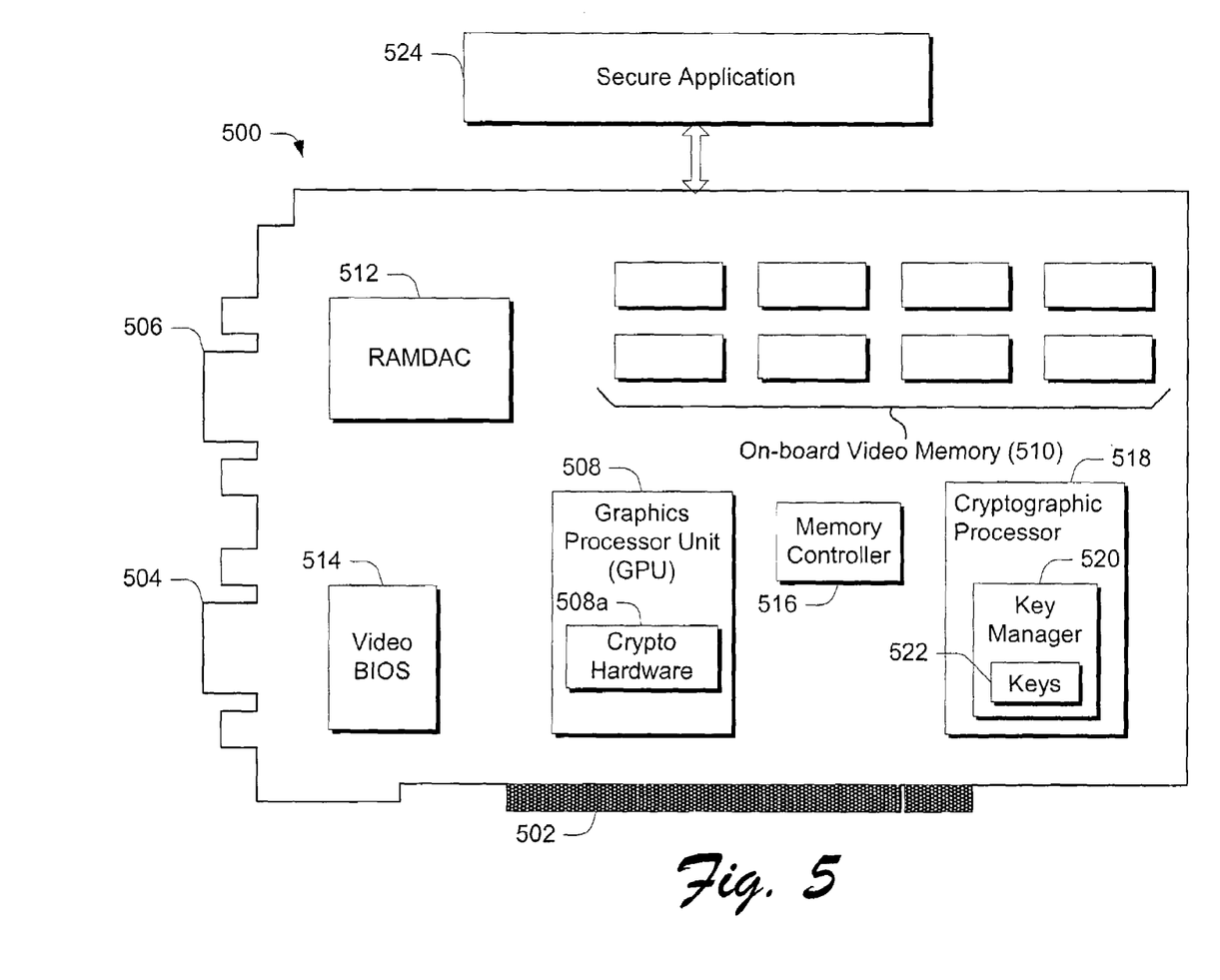
FIG. 5 is a block diagram that shows various components of an exemplary video or graphics card that is intended for use in a computer system, in accordance with one embodiment.

FIG. 5 shows an exemplary video (or graphics) card 500 architecture in accordance with one embodiment. Card 500 includes a bus connector 502 that plugs into a port on a typical computer. Video card 500 also includes a monitor connector 504 (e.g. a 15-pin plug) that receives a cable that connects to a monitor. Video card 500 can, but need not, include a digital video-out (e.g. DVI) socket 506 that can be used for sending video images to digital displays and the like.

Like the video card of FIG. 1, video card 500 comprises a graphics processor unit (GPU) 508, video memory 510, display converter or random access memory digital-to-analog converter (RAMDAC) 512, and driver software which can be included in the Video BIOS 514.

GPU 508 is a dedicated graphics processing chip that controls all aspects of resolution, color depth, and all elements associated with rendering images on the monitor screen. The memory controller (sometimes integrated into the GPU) manages the memory on the video card. The computer's central processing unit or CPU (not shown) sends a set of drawing instructions and data, which are interpreted by the graphics card's proprietary driver and executed by the card's GPU 508. GPU 508 performs such operations as bitmap transfers and painting, window resizing and repositioning, line drawing, font scaling and polygon drawing. The GPU can then write the frame data to the frame buffer (or on-board video memory 310). In the illustrated and described embodiment, GPU 508 can comprise cryptographic hardware 508a which can assist in cryptography, as described in more detail below.

The information in the video memory frame buffer is an image of what appears on the screen, stored as a digital bitmap. RAMDAC 512 is utilized to convert the digital bitmap into a form that can be used for rendering on the monitor, as described above.

In addition to these components, in this embodiment, video card 500 comprises a memory controller 516 which can include a cache (not specifically illustrated), a cryptographic processor 518 that can include a key manager 520, as well as a bank of keys 522. Although illustrated as part of the cryptographic processor, the key manager 520 can comprise a separate component.

Memory controller 516 receives data on the video card and manages the data in the video memory 510. The memory controller can also be responsible for managing data transfers between the video card and system memory.

Cryptographic processor 518 is responsible for organizing cryptographic functions that take place on the video card.

It is desirable for secure graphics cards, such as card 500, to be able to authenticate themselves as such. In particular, it is desirable for trusted software, such as secure application 524, to be able to distinguish a secure graphics card from a traditional graphics card or a circumvention device. In addition, it is desirable for trusted software to be able to reveal cryptographic keys to the graphics card and to be able to verify that the receiver of the keys is indeed a secure graphics card. For this purpose, in accordance with the described embodiment, secure graphics cards such as card 500 are equipped with cryptographic processor 518, which performs standard cryptographic tasks of authentication and key transport.

In accordance with the described embodiment, cryptographic processor 518 is individualized and certified during manufacture. Individual cryptographic processors can contain a unique private decryption key Kpriv. Although subject to change depending on different requirements and design constraints, the associated encryption/decryption algorithm can be RSA, and the key length can be 1024 bits. The cryptographic processor can be permanently attached to graphics card 500, either by adding it to an existing chip or by adding it as a separate chip to the card.

In the illustrated and described embodiment, cryptographic processor 518 can implement a public key crypto algorithm (as defined below) and hides a unique private key. It can perform one public key decryption and can utilize a public key accelerator. In addition, the cryptographic processor can implement a symmetric cipher (AES) and some control logic.

In one embodiment, the cryptographic processor has the following volatile registers.

A 256-bit register S for the session key. The lifetime of this key is typically the running time of the trusted software.

An array of x (x TBD) index keys. Each key is 128 bits long. Each key can be associated with a particular surface and can be used by the graphics card to decrypt its contents. The lifetime of each key can be governed by instructions from the trusted software.

As noted above, in the illustrated and described embodiment, the cryptographic processor is permanently attached to the graphics card. In this example, there are two interfaces to cryptographic processor 518—an external interface to trusted software 524, and an interface to GPU 508. In the illustrated and described embodiment, the interface to the trusted software 524 is standardized, while the interface to the GPU 508 can be implementation-specific.

The External Interface

The external interface can use the basic PK encryption protocol for authentication and key transport. Under this protocol, trusted software 524 encrypts a session key with the public key of cryptographic processor 518. The cryptographic processor receives the resulting cryptoblob and decrypts it with its private key, thus obtaining the session key. Now, the trusted software and the cryptographic processor share a secret. The trusted software can use this session key to send instructions to the cryptographic processor. At an abstract level, the external interface can be exposed through various functions by the cryptographic processor.

The Internal Interface

The term "internal interface" refers to the interface between cryptographic processor 518 and the rest of graphics card 500. The cryptographic processor can use this interface to configure the GPU's cryptographic hardware. In one embodiment, the details of this interface are up to the implementation of each individual graphics card, subject to the following restrictions:

Removal of the cryptographic processor from the graphics card should not be trivial. If the cryptographic processor is implemented as a separate chip, this is mainly a restriction on the mechanical interface, which attaches the cryptographic processor to the graphics card. Typically, the cryptographic processor should be soldered onto the graphics card. Alternatively, the cryptographic processor could reside on the same chip as the main GPU. Use of standardized mechanical interfaces that allow the cryptographic processor to be removed (for example, a socket-mounted smart card reader) is not desirable.

The physical connection between the cryptographic processor and the rest of the graphics card should not be accessible and should not be exposed through standard interfaces. For example, a USB connector on this bus is not desirable.

Implementation Example

Figure 6:
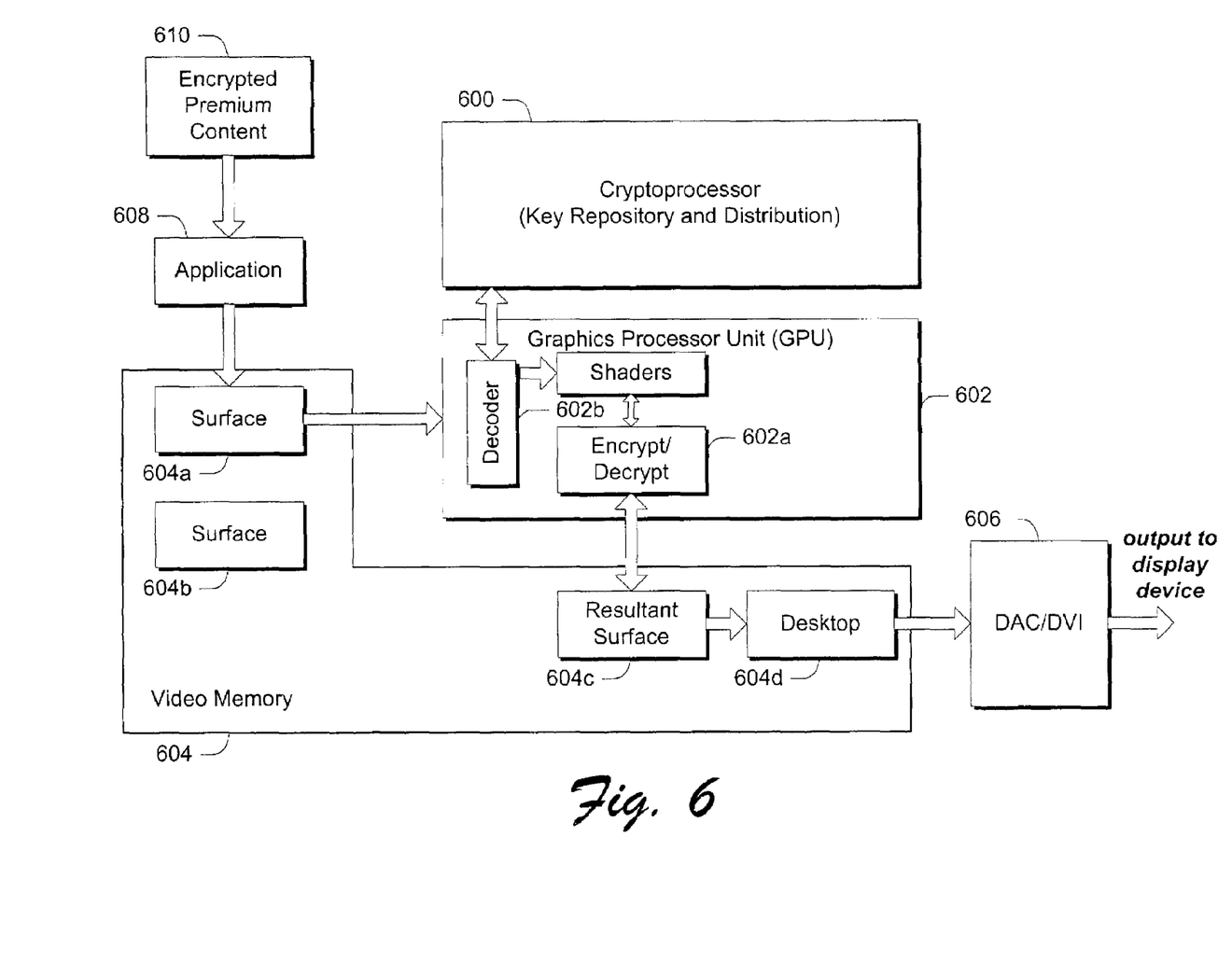
FIG. 6 is a block diagram that shows various components that can be utilized to implement one or more embodiments.

FIG. 6 illustrates diagrammatically but one particular implementation example. This illustration is not intended to limit application of the claimed subject matter. Rather, such illustration is intended to illustrate but one way in which the various inventive features described in this document can be implemented. In this example, cryptographic management is implemented by a discrete cryptographic processor which interfaces with the GPU on pixel accesses.

In this particular example, components of the video card include cryptoprocessor 600 which serves as a key repository and key distributer, GPU 602, video memory or VRAM 604 and a DAC/DVI component 606 that is configured to display data to a suitable display device. Inside the GPU 602, various components can include so-called pixel shaders that effectively perform programs or operations on the data that it receives. Notice in this example that the GPU comprises encryption and decryption capabilities (e.g. encryption/decryption hardware) as indicated by encryptor/decryptor 602a and decryptor 602b. Here, the decryptor 602b is added to the GPU's texture mapping unit on the input side, and encryptor/decryptor 602a is added to the alpha blending unit on the output side. In implementing this particular functionality, hardware designers can follow some rules to facilitate implementation. Specifically, since stream ciphers do not enable random access to encrypted data, the system should use block ciphers, e.g. encrypting the data 128-bits at a time. The texture mapping unit can decrypt on a cache line fill, and the alpha blending unit can decrypt when reading a cache line from the color buffer and encrypt before writing. The encryption keys used in these operations can, and should often be different. Computational tasks other than 3D rendering, such as video decoding, are straightforward extensions of the just-described paradigm. Instead of textures, video macroblocks would serve as the encrypted input; instead of a color buffer, the output frame being decoded would serve as the encrypted output. If content must be protected as it is delivered inband in the command stream to the GPU, the command buffer may be encrypted as well.

Video memory 604 comprises multiple surfaces 604a, 604b which serve to hold encrypted content which, in this example, is represented by encrypted premium content 610. Video memory 604 also includes one or more resultant surfaces 604c, and a desktop or primary surface 604d that is read, decrypted and output by DAC/DVI component 606.

This system also includes an application 608 that has a trusted portion that sets up the encryption capabilities of the cryptographic processor 600. That is, application 608 has a trusted component that will set up the keys with the cryptographic processor 600. The application really does not need access to the data. Rather, the application can really simply direct GPU 602 on what operations should be performed. This enables the application to leverage the GPU so that the GPU itself is responsible for manipulating the data.

For example, assume that application 608 wants to do picture-in-picture (PIP) video. The application can create three encrypted surfaces, but does not need to know anything about the video. When the application creates the surfaces (in VRAM), it communicates with the cryptographic processor 600 and creates or otherwise indicates or provides a key associated with each of the surfaces to the cryptographic processor. The key can be managed in a bank of keys in the cryptographic processor 600. In this embodiment and as noted above, there is one key per associated encrypted surface.

Now, when operating system tells the graphics card to run a particular program on these created surfaces, the graphics driver will identify the input surfaces (such as surfaces 604a, 604b), and will then ask the cryptographic processor 600 to select keys associated with the surfaces of interest which, in turn, initializes the encryptors/decryptors in the GPU.

In one implementation, the encryption and decryption keys (or sets of keys) can be correlated by their index in the cryptoprocessor. For example, the trusted portion of the application of 608 will negotiate the keys with the cryptoprocessor 600 and it will return the key indices to the untrusted portion of the application 608. The untrusted application will create surfaces which are identified as being encrypted or decrypted using the key indices. When the GPU 602 performs operations, it will use the key indices to initialize the encryption and decryption keys on the surfaces. The cryptoprocessor will receive the request from the GPU to set the indices on the encryptors and decryptors. The cryptoprocessor can decide to successfully setup the encryptors (304 and 306 in FIG. 3) and decryptors (316 in FIG. 3) if the indices are compatible (i.e. it is valid to transcript from each input key to the output key). The cryptoprocessor can map each key index into the actual key to transfer to the encryptor and decryptor component. If the untrusted application attempts to setup an invalid configuration, then the operation will fail or could produce unusable data (i.e. go ahead with the decryption with invalid keys producing incorrectly decrypted data).

When GPU 602 actually runs the program on the pixels, decryptor 602b reads a pixel, decrypts it with the appropriate key, the GPU operates on the pixel with the program, and then the GPU re-encrypts the resultant pixel (as with encryptor/decryptor 602a) and writes it to an appropriate surface, such as surface 604c in VRAM 604. The DAC/DVI component 606 can then decrypt the data for subsequent display.

In the past, the processing of the video data would typically be performed off of the video card by the computer system's central processing unit (CPU) under the influence of the application. This approach to video processing does not scale and, while adequate for fairly small pictures, is entirely inadequate for larger pictures such as those employed in HDTV. In this past scenario, the GPU's role was really relegated to that of the DAC functionality on the back end. In order to make video processing algorithms scale, hardware acceleration is needed. By performing the operations using the GPU, one can achieve the hardware acceleration that is necessary to provide desirable, scalable performance. In addition, while providing the desired scalability, the above-described systems and methods can be utilized to protect the data any time when it is not being processed by the GPU. As the data is maintained in encrypted form, the data is fairly well protected against theft and use by unauthorized components or parties.

As a further protective measure and to protect the content from being moved on the desktop surface 604d, the content can be encrypted on the desktop surface by either including position information or transcrypting to a position dependent global key. The position can also be enforced by limiting which processes can update the origin (or clipping lists) and the key table. With a steam cipher, the second encryption can be applied before the first encryption is removed ensuring that the clear stream is not visible.

Memory Optimizations

The following section describes various optimizations that can be utilized in connection with the encryption and decryption that takes place on the video card.

Since textures and off-screen surfaces typically require random access, it is advantageous that they be encoded with block ciphers. There is good synergy between the typical block size for a block cipher and the typical cache line size for a modem 3D accelerator. That is, if the cache line and block size are both 128 bits (or bear some integer-size relation), then efficient encryption and decryption can be implemented in the hardware. Even if there are slight differences (for example, block size of 128 bits and cache line size of 256 bits) the hardware implementation can be efficient.

The key size and usage pattern must be chosen to match the cache structure of the video accelerator to feasibly implement the per pixel encryption. In fact, the decryptors and encryptors can be moved logically into the memory controller portion of the GPU. Consider the model where pixel data is read into a cache page on a pixel access (or copied from the cache if it is already present) and pixel data is written to the write cache then copied to memory on a write cache page eviction. Instead of decrypting on a per pixel basis, the memory can be decrypted on a per cache page read. If the pixel data has already been decrypted (the key index could be used to decide this), then the decryption can be avoided. Output data only needs to be re-encrypted when a page write occurs. The cache needs to be purged of encrypted data before and after the GPU program has completed.

Another optimization is to maintain the cache between programs if the same output key is used. However, during the period between operations, the rest of the GPU should be blocked from accessing cache pages containing decrypted content. This optimization would be necessary for performing operations such as video decoding which perform hundreds of operations on the same input and output data.

Implementing Encryption on Current Swizzled Hardware Designs

One problem with encrypted texture data is that a block encryption scheme requires an adjacent block of bytes to be available before it can be encrypted or decrypted; and a cache line fill requires that the pixel data be "swizzled"—that is, the translation from (X,Y) position in the image to an address must be formed such that the cache line fill yields a 2D region of pixels. To date, hardware vendors have exposed ostensibly linear surface formats while swizzling image data without the knowledge of the application. Since trusted software will be emitting the encrypted texture data, however, it must have a priori knowledge of the swizzling scheme so it can encrypt adjacent blocks of data and preserve 2D locality. A good solution is to define a dictionary of swizzled-image formats (including YUV 4:4:4, 4:2:2, and 4:2:0 as well as RGB formats) for use by the application. The performance of these formats may not be quite as high as if the images were swizzled to a hardware-specific format, but the encryption is presumably worth a slight performance degradation.

CONCLUSION

The various methods and systems described above can protect content such as premium content like movies, programs, and other types of digital audio/visual content. In the described embodiments, an architecture and related methods protect content by maintaining the content in encrypted form, whether the content resides in video card memory (referred to herein as "VRAM"), or some other local or remote memory subsystem. The methods and systems enable video card co-processors, such as the graphics processing unit (GPU) to manipulate the encrypted data. Processing on the GPU can be controlled, in some embodiments, by an application that need not necessarily be entirely trusted. Maintaining the content in encrypted form in the memory is more resistant to security leaks since only select portions of the GPU are able to access unencrypted content.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method comprising:
   decrypting encrypted data that resides on one or more memory surfaces established on a video card, said act of decrypting being performed under the influence of a cryptographic processor that resides on the video card, said act of decrypting taking place only when an operation is to be performed on the data by a graphics processor unit (GPU) that resides on the video card and is separate from the cryptographic processor;
   performing an operation on the decrypted data using the GPU to provide resultant data;
   re-encrypting, under the influence of the cryptographic processor, the resultant data; and
   writing the encrypted resultant data to a memory surface associated with the video card, wherein:
      a trusted software component establishes the one or more memory surfaces on the video card and negotiates one or more keys with the cryptographic processor to associate each of the one or more memory surfaces with at least one unique key; and
      the cryptographic processor distributes the negotiated one or more keys to cryptographic hardware of the GPU which uses the keys to perform the acts of decrypting and re-encrypting.

2. The method of claim 1, wherein the acts of decrypting and re-encrypting are performed using one or more block ciphers.

3. The method of claim 1, wherein the act of decrypting and re-encrypting take place on a pixel-by-pixel basis.

4. The method of claim 1, wherein the cryptographic processor comprises a hardware component mounted on the video card.

5. The method of claim 1, wherein the cryptographic processor comprises an integrated circuit chip mounted on the video card.

6. The method of claim 1, wherein the cryptographic processor comprises a trusted component.

7. A method comprising:
   decrypting encrypted data that resides on one or more memory surfaces of a video card memory, said act of decrypting taking place only when an operation is to be performed on the data by a graphics processor unit (GPU) that resides on the video card;

performing an operation on the decrypted data using the GPU to provide resultant data;

re-encrypting the resultant data, wherein the re-encrypting is implemented by the video card; and writing the encrypted resultant data to a video card memory surface associated with the video card wherein:

a trusted software component establishes the one or more memory surfaces on the video card and negotiates one or more keys with a cryptographic processor provided on the video card separate from the GPU to associate each of the one or more memory surfaces with at least one unique key; and the cryptographic processor distributes the negotiated one or more keys to cryptographic hardware of the GPU which uses the keys to perform said acts of decrypting and re-encrypting.

8. The method of claim 7, wherein the acts of decrypting and re-encrypting are performed using one or more block ciphers.

9. The method of claim 7, wherein the acts of decrypting and re-encrypting take place on a pixel-by-pixel basis.

10. A system comprising:

means for decrypting encrypted data that resides on one or more memory surfaces of a video card memory only when an operation is to be performed on the data by a graphics processor unit (GPU) that resides on the video card under the influence of a cryptographic processor separate from the GPU mounted on the video card;

means for performing an operation on the decrypted data to provide resultant data;

means for re-encrypting the resultant data, wherein the means for re-encrypting resides on the video card;

means for writing the encrypted resultant data to a video card memory surface associated with the video card, and a trusted software component to establish the one or more memory surfaces on the video card and negotiate one or more keys with the cryptographic processor such that each of the one or more memory surfaces is associated with at least one unique key;

wherein the cryptographic processor distributes the one or more keys to said means for decrypting and said means for re-encrypting to perform the decrypting and re-encrypting respectively.

11. The system of claim 10, wherein the means for decrypting comprises, at least in part, cryptographic hardware inside the GPU.

12. The system of claim 10, wherein the means for performing comprises a GPU.

13. The system of claim 10, wherein the means for re-encrypting comprises, at least in part, cryptographic processor hardware mounted on the video card.

14. A system comprising:

a video card;

a graphics processor unit (GPU) on the video card and configured to process video data that is to be rendered on a display device;

memory on the video card comprising one or more input memory surfaces configured to hold encrypted data that is to be operated upon by the GPU, and one or more output memory surfaces configured to hold encrypted resultant data that is to be rendered on the display device;

a cryptographic processor on the video card, wherein the cryptographic processor is separate from the GPU, and configured to initialize cryptographic hardware of the GPU including one or more encryptors and one or more decryptors to control encryption and decryption on the video card, a trusted software component to negotiate one or more keys with the cryptographic processor such that each of the one or more input and output memory surfaces is associated with at least one unique key, the cryptographic processor being further configured to distribute said negotiated keys to the cryptographic hardware of the GPU to enable encrypted data on one or more of the input memory surfaces to be decrypted by said one or more decryptors in connection with an operation that is to be performed on the data by the GPU; and to enable data that has been operated upon by the GPU to be encrypted by said one or more encryptors to an output memory surface.

15. The system of claim 14, wherein the cryptographic processor is configured to use block ciphers to effect encryption and decryption.

16. The system of claim 14, wherein the cryptographic processor comprises a hardware component mounted on the video card.

17. The system of claim 14, wherein the cryptographic processor comprises an integrated circuit chip.

18. The system of claim 14, wherein the cryptographic processor comprises a trusted component.

19. The system of claim 14, wherein the cryptographic processor is configured to set up a session key with the trusted software component.

20. A computer system embodying the system of claim 14.

21. A method comprising:

providing multiple input memory surfaces that are to hold encrypted data that is to be processed by a graphics processor unit (GPU) on a video card;

associating, with each input memory surface, a decryptor that is uniquely configured so as to decrypt the encrypted data that is held by the associated input memory surface;

decrypting, with at least one associated decryptor of the GPU, encrypted data that resides on at least one respective input memory surface;

performing an operation on the decrypted data using the GPU to provide resultant data;

re-encrypting the resultant data; and writing the encrypted resultant data to an output memory surface associated with the video card;

wherein the video card includes a cryptographic processor as a distinct component that is configured to:

negotiate one or more cryptographic keys with a trusted software component; and to initialize said decryptor of the GPU to perform said act of decrypting.

22. The method of claim 21, wherein the act of providing the multiple input memory surfaces comprises providing at least one input memory surface on the video card.

23. The method of claim 21, wherein:

the act of re-encrypting comprises using an encryptor of the GPU that is uniquely associated with the output memory surface to re-encrypt the resultant data; and the cryptographic processor is further configured to initialize said encryptor of the GPU to perform said act of re-encrypting.

24. The method of claim 21, wherein the act of re-encrypting comprises using an encryptor of the GPU that is uniquely associated with the output memory surface to re-encrypt the resultant data, and wherein negotiated key indices are used to identify and regulate which keys are used in decrypt and re-encrypt operations.

25. The method of claim 21, wherein the acts of decrypting and re-encrypting are performed using one or more block ciphers.

26. The method of claim 21, wherein the acts of decrypting and re-encrypting take place on a pixel-by-pixel basis.

27. The method of claim 21, wherein the acts of decrypting and re-encrypting are performed under the influence of a cryptographic processor that resides on the video card.

28. The method of claim 27, wherein the cryptographic processor comprises an integrated circuit chip.

29. The method of claim 27, wherein the cryptographic processor comprises a trusted component.

30. The method of claim 21, wherein the act of decrypting is performed only when the GPU is to perform an operation on data that resides on a particular input memory surface.

31. The method of claim 21 further comprising restricting one or more operations that can be performed by the GPU based on whether encrypted output is available.

32. The method of claim 21 further comprising decrypting the encrypted resultant data for rendering on a display device.

33. The method of claim 21 further comprising decrypting, with a display convertor, the encrypted resultant data for rendering on a display device.

34. A system comprising:
a video card;
a graphics processor unit (GPU) on the video card and configured to process video data that is to be rendered on a display device;
memory on the video card comprising one or more input memory surfaces configured to hold encrypted data that is to be operated upon by the GPU, and one or more output memory surfaces configured to hold encrypted resultant data that is to be rendered on the display device;
a cryptographic processor on the video card, wherein the cryptographic processor is separate from the GPU, and configured to control encryption and decryption on the video card, the cryptographic processor comprising a key manager for managing keys that can be utilized for encrypting and decrypting data on the video card, said managing keys including:
negotiating the keys with a trusted software component such that each individual input memory surface has its own unique associated key for decrypting encrypted data held thereon;
distributing corresponding keys to the GPU to enable encrypted data on one or more of the input memory surfaces to be decrypted by the GPU so that the decrypted data can be operated upon by the GPU; and
distributing corresponding keys to the GPU to enable data that has been operated upon by the GPU to be encrypted by the GPU to an output memory surface.

35. The system of claim 34, wherein the cryptographic processor is configured to control encryption and decryption using block ciphers.

36. The system of claim 34, wherein encryption and decryption takes place on a pixel-by-pixel basis.

37. The system of claim 34, wherein encrypted data held on an input memory surface is decrypted only when it is to be operated upon by the GPU.

38. The system of claim 34, wherein the cryptographic processor comprises an integrated circuit chip.

39. The system of claim 34, wherein the cryptographic processor comprises a trusted component.

40. The system of claim 34, wherein the cryptographic processor is configured to set up a session key with the trusted software component.

41. A computer system embodying the system of claim 34.

42. A method comprising:
receiving encrypted data that is to be processed by a video card for rendering on a display device;
writing the encrypted data to one or more input memory surfaces on the video card;
responsive to an indication that a graphics processor unit (GPU) on the video card is to perform an operation on the encrypted data, decrypting the encrypted data with cryptographic hardware of the GPU under the influence of a cryptographic processor in the form of a hardware component, separate from the GPU, that resides on the video card;
operating on the decrypted data with the GPU to provide resultant data;
re-encrypting the resultant data, wherein the re-encrypting is implemented by the video card with the cryptographic hardware of the GPU;
writing the encrypted data to an output memory surface; and
decrypting the encrypted resultant data for rendering on the display device;
wherein the cryptographic hardware of the GPU is configurable by the cryptographic processor to perform said acts of decrypting the encrypted data and re-encrypting the resultant data using one or more keys that the cryptographic processor negotiates with a trusted software component and distributes to the cryptographic hardware of the GPU.

43. The method of claim 42, wherein the act of writing the encrypted data to one or more input memory surfaces comprises writing the encrypted data to an input memory surface that resides on the video card.

44. The method of claim 42, wherein each individual input memory surface has its own associated unique decryptor that can be used for decrypting encrypted data held thereon.

45. The method of claim 42, wherein each individual input memory surface has an associated unique decryptor that can be used to decrypt encrypted data held thereon, and the act of decrypting the encrypted data comprises using, for a particular input memory surface, its associated unique decryptor to decrypt the data.

46. A system comprising:
a video card;
a graphics processor unit (GPU) on the video card and configured to perform operations on video data that is to be rendered on a display device;
memory on the video card comprising input surfaces for holding data that is to be operated on by the GPU, and output surfaces for holding data that has been operated upon by the GPU;
a cryptographic processor implemented as hardware component mounted on the video card, wherein the cryptographic processor is separate from the GPU, and configured to control encryption and decryption on the video card;
a first interface associated with the cryptographic processor and through which a trusted software component sets up a session key and sends instructions to the cryptographic processor; and a second interface associated with the cryptographic processor and through which the cryptographic processor configures the GPU for decrypting encrypted data held in one or more of the input surfaces;

wherein, to configure the GPU for decrypting the encrypted data, the cryptographic processor:

negotiates keys with the trusted software component via the first interface such that each of said input surfaces and output surfaces is associated with at least one unique key; and distributes corresponding keys via the second interface to initialize cryptographic hardware integrated with the GPU to perform the decrypting.

47. The system of claim 46, wherein the cryptographic processor is further configured to initialize the cryptographic hardware integrated with the GPU to perform re-encrypting of data that has been operated upon by the GPU to said output surfaces.

48. The system of claim 46, wherein the cryptographic processor comprises a trusted hardware component mounted on the video card.

49. The system of claim 46, wherein the cryptographic processor comprises an integrated circuit chip mounted on the video card.

50. The system of claim 46, wherein the cryptographic processor is configured to associate, with each input surface, a unique decryptor of the cryptographic hardware integrated with the GPU that is configured to decrypt encrypted data held by the input surface.

51. A computer system embodying the system of claim 46.

52. The system of claim 46, wherein the second interface provides key identification information that an untrusted or trusted application and associated driver can use to configure the cryptographic hardware integrated with the GPU for encryption and decryption.

* * * * *